United States Patent
Hanlon et al.

(10) Patent No.: US 8,134,328 B2
(45) Date of Patent: Mar. 13, 2012

(54) ACTIVE PILOT INCEPTOR WITH SELF WARM-UP

(75) Inventors: Casey Hanlon, Queen Creek, AZ (US); Shmuel Ezran, Torrance, CA (US); Don Christensen, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 981 days.

(21) Appl. No.: 12/108,425

(22) Filed: Apr. 23, 2008

(65) Prior Publication Data

US 2009/0266939 A1 Oct. 29, 2009

(51) Int. Cl.
*G05B 11/01* (2006.01)

(52) U.S. Cl. .... 318/628; 318/436; 318/159; 318/400.04

(58) Field of Classification Search .............. 318/584, 318/590, 625, 400.04, 400.07, 400.08, 400.23, 318/400.32, 708, 628, 436, 159; 244/220, 244/221, 223, 228, 234, 75.1
See application file for complete search history.

(56) References Cited

U.S. PATENT DOCUMENTS

| | | | |
|---|---|---|---|
| 3,208,237 A | 9/1965 | Gerteis | |
| 3,445,743 A | 5/1969 | Blair | |
| 3,582,712 A | 6/1971 | Blair | |
| 3,717,804 A | 2/1973 | Dikinis et al. | |
| 3,774,096 A | 11/1973 | Hann | |
| 4,135,122 A | 1/1979 | Holmquist et al. | |
| 4,195,324 A | 3/1980 | Waltz | |
| 4,638,643 A | 1/1987 | Sakazume et al. | |
| 5,264,768 A * | 11/1993 | Gregory et al. | 318/561 |
| 5,291,113 A * | 3/1994 | Hegg et al. | 318/584 |
| 5,347,204 A * | 9/1994 | Gregory et al. | 318/632 |
| 5,694,014 A * | 12/1997 | Hegg et al. | 318/564 |
| 5,708,336 A | 1/1998 | Eyerly et al. | |
| 6,342,771 B1 | 1/2002 | Todteberg | |
| 6,386,279 B1 | 5/2002 | Okabe et al. | |
| 6,617,819 B2 | 9/2003 | Dohmae et al. | |
| 6,642,682 B1 | 11/2003 | Perkins et al. | |
| 7,233,476 B2 * | 6/2007 | Goldenberg et al. | 361/140 |
| 2003/0183728 A1 * | 10/2003 | Huynh | 244/224 |
| 2007/0245706 A1 | 10/2007 | Bell et al. | |

* cited by examiner

*Primary Examiner* — Walter Benson
*Assistant Examiner* — Thai Dinh
(74) *Attorney, Agent, or Firm* — Ingrassia Fisher & Lorenz, P.C.

(57) ABSTRACT

An active pilot inceptor system includes a pilot inceptor, a multi-phase motor, and a motor control. The pilot inceptor is configured to receive user input and is operable, in response to the user input, to move to a control position. The multi-phase motor is coupled to the pilot inceptor to selectively supply haptic feedback thereto. The motor control is operable to selectively energize the multi-phase motor in a manner that causes the multi-phase motor to generate torque and supply the haptic feedback to the inceptor, and to selectively energize the multi-phase motor in a manner that the multi-phase motor does not generate torque.

19 Claims, 4 Drawing Sheets

ACTIVE PILOT INCEPTOR WITH SELF WARM-UP

TECHNICAL FIELD

The present invention generally relates to active pilot inceptors and, more particularly, to self warm-up systems and methods for active pilot inceptors.

BACKGROUND

Aircraft typically include a plurality of flight control surfaces that, when controllably positioned, guide the movement of the aircraft from one destination to another. The number and type of flight control surfaces included in an aircraft may vary depending, for example, on whether the aircraft is a fixed-wing or rotary-wing aircraft. For example, most fixed-wing aircraft typically include primary flight control surfaces, such as a pair of elevators, a rudder, and a pair of ailerons, to control aircraft movement in the pitch, yaw, and roll axes. Aircraft movement of rotary-wing aircraft in the pitch, yaw, and roll axes is typically controlled by via movement of the rotating aircraft rotors, and may additionally be controlled via movement of one or more flight control surfaces.

The positions of the aircraft flight control surfaces and/or rotors are typically controlled via a flight control system. The flight control system, in response to position commands that originate from either the flight crew or an aircraft autopilot, moves the aircraft flight control surfaces and/or rotors to the commanded positions. In most instances, this movement is effected via actuators that are coupled to the flight control surfaces. Typically, the position commands that originate from the flight crew are supplied via one or more inceptors. For example, many fixed-wing aircraft include a plurality of inceptors, such as yokes or side sticks and rudder pedals, one set each for the pilot and for the co-pilot, and many rotary-wing aircraft include one or more of a cyclic, a collective, and rudder pedals. In many modern aircraft, including both fixed-wing aircraft and rotary-wing aircraft, electric motors are coupled to one or more of the inceptors to supply force feedback (or "haptic feedback") to the user. These inceptors are generally referred to as active inceptors.

Depending on overall purpose and mission, some aircraft may be required to take off from environments that experience relatively low temperatures. Thus, many systems in these aircraft, including the above-mentioned active inceptors, may need to startup and run at these relatively low temperatures. In regard to the active inceptors, this may adversely impact the size of the motors that are used to supply the haptic feedback. In particular, relatively large motors may be needed due, at least in part, to the increased friction associated with lubricant properties, gear train tolerances, and bearing tolerances at the relatively low temperatures.

Hence, there is a need for active inceptors that may be implemented without overly large motors and still startup and operate in relatively low temperature environments. The present invention addresses at least this need.

BRIEF SUMMARY

In one embodiment, and by way of example only, an active pilot inceptor system includes a pilot inceptor, a multi-phase motor, and a motor control. The pilot inceptor is configured to receive user input and is operable, in response to the user input, to move to a control position. The multi-phase motor is coupled to the pilot inceptor to selectively supply haptic feedback thereto. The motor control is operable to selectively energize the multi-phase motor in a manner that causes the multi-phase motor to generate torque and supply the haptic feedback to the inceptor, and to selectively energize the multi-phase motor in a manner that the multi-phase motor does not generate torque.

In another exemplary embodiment, an active pilot inceptor system includes a pilot inceptor, a multi-phase motor, a gearbox housing, one or more lubricated gears, and a motor control. The pilot inceptor is configured to receive user input and is operable, in response to the user input, to move to a control position. The multi-phase motor is coupled to the pilot inceptor to selectively supply haptic feedback thereto. The gearbox housing is disposed in proximity to the multi-phase motor to receive heat generated in the multi-phase motor. The one or more lubricated gears are disposed within the gearbox housing and are coupled between the pilot inceptor and the multi-phase motor. The motor control is operable to selectively energize the multi-phase motor in a manner that causes the multi-phase motor to generate torque and supply the haptic feedback to the inceptor, and to selectively energize the multi-phase motor in a manner that the multi-phase motor does not generate torque.

In yet another exemplary embodiment, a method of warming up an active pilot inceptor system that utilizes a multi-phase motor to supply haptic feedback to a pilot inceptor includes measuring a temperature of at least a portion of the active pilot inceptor system, and determining if the measured temperature is below a predetermined temperature. If the measured temperature is below the predetermined temperature, the multi-phase motor is at least selectively energized in a manner that the multi-phase motor does not generate torque.

Other desirable features and characteristics of the active pilot inceptor system and method will become apparent from the subsequent detailed description and the appended claims, taken in conjunction with the accompanying drawings and preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Figure 1:
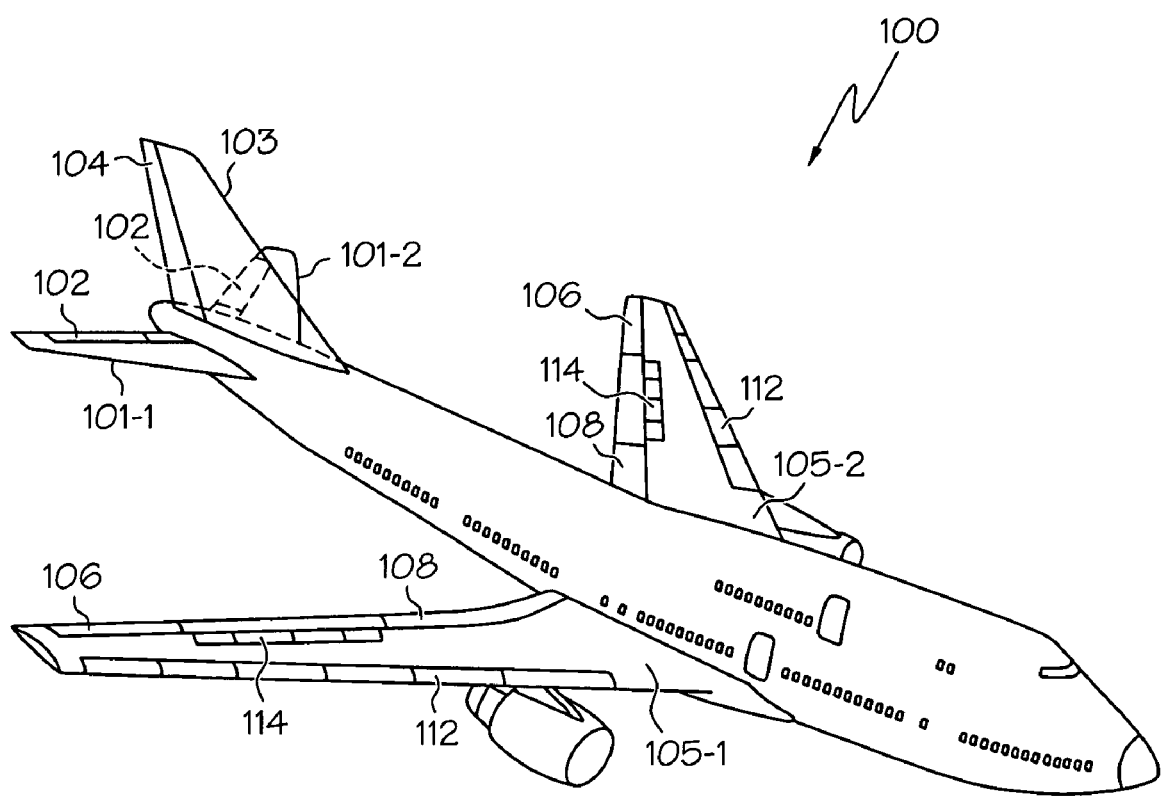
FIG. 1 is a perspective view of an exemplary fixed-wing aircraft depicting primary and secondary flight control surfaces.

Turning now to FIG. 1, a perspective view of an exemplary fixed-wing aircraft is shown. In the illustrated embodiment, the aircraft 100 includes first and second horizontal stabilizers 101-1 and 101-2, respectively, a vertical stabilizer 103, and first and second wings 105-1 and 105-2, respectively. An elevator 102 is disposed on each horizontal stabilizer 101-1, 101-2, a rudder 104 is disposed on the vertical stabilizer 103, and an aileron 106 is disposed on each wing 105-1, 105-2. In addition, a plurality of flaps 108, slats 112, and spoilers 114 are disposed on each wing 105-1, 105-2. The elevators 102, the rudder 104, and the ailerons 106 are typically referred to as the primary flight control surfaces, and the flaps 108, the slats 112, and the spoilers 114 are typically referred to as the secondary flight control surfaces.

The primary flight control surfaces 102-106 control aircraft movements about the aircraft pitch, yaw, and roll axes. Specifically, the elevators 102 are used to control aircraft movement about the pitch axis, the rudder 104 is used to control aircraft movement about the yaw axis, and the ailerons 106 control aircraft movement about the roll axis. It is noted, however, that aircraft movement about the yaw axis can also be achieved by varying the thrust levels from the engines on opposing sides of the aircraft 100.

The secondary control surfaces 108-114 influence the lift and drag of the aircraft 100. For example, during aircraft take-off and landing operations, when increased lift is desirable, the flaps 108 and slats 112 may be moved from retracted positions to extended positions. In the extended position, the flaps 108 increase both lift and drag, and enable the aircraft 100 to descend at a lower airspeed, and also enable the aircraft 100 get airborne over a shorter distance. The slats 112, in the extended position, increase lift, and are typically used in conjunction with the flaps 108. The spoilers 114, on the other hand, reduce lift and when moved from retracted positions to extended positions, which is typically done during aircraft landing operations, may be used as air brakes to assist in slowing the aircraft 100.

Figure 2:
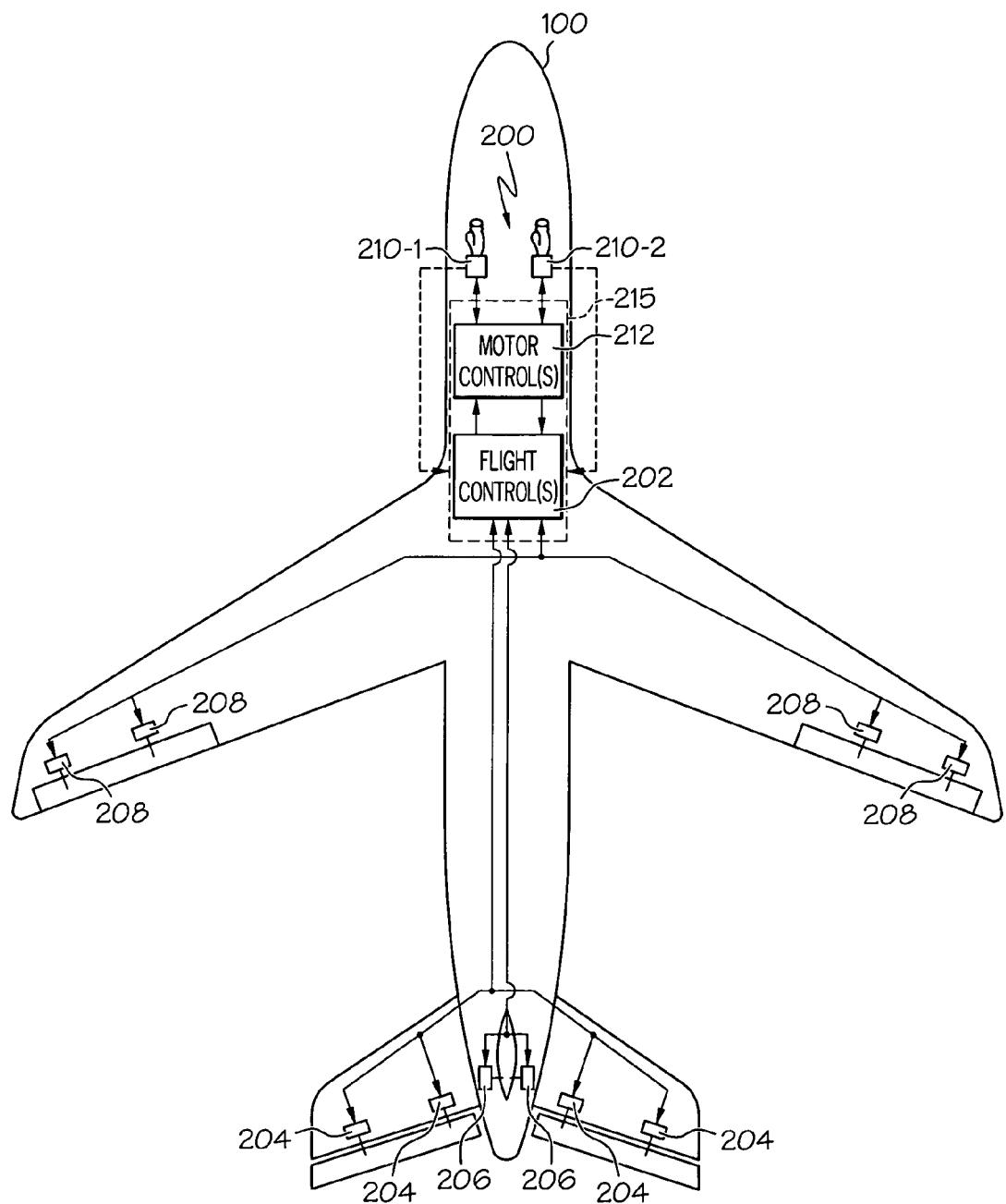
FIG. 2 is a schematic depicting portions of an exemplary flight control surface actuation system according to one embodiment of the present invention.

The flight control surfaces 102-114 are moved to commanded positions via a flight control surface actuation system 200, an exemplary embodiment of which is shown in FIG. 2. In the depicted embodiment, the flight control surface actuation system 200 includes flight controls 202, a plurality of primary flight control surface actuators, which include elevator actuators 204, rudder actuators 206, and aileron actuators 208. It will be appreciated that the system 200 may be implemented with a plurality of flight controls 202. However, for ease of description and illustration, only a single, multi-channel control 202 is depicted. It will additionally be appreciated that one or more functions of the flight controls 202 could be implemented using a plurality of devices.

Before proceeding further, it is noted that the flight control surface actuation system 200 additionally includes a plurality of secondary control surface actuators, such as flap actuators, slat actuators, and spoiler actuators. However, the operation of the secondary flight control surfaces 108-114 and the associated actuators is not needed to fully describe and enable the present invention. Thus, for added clarity, ease of description, and ease of illustration, the secondary flight control surfaces and actuators are not depicted in FIG. 2, nor are these devices further described. Moreover, controls for the rudder 104 and non-illustrated aircraft brakes are also not included in FIG. 2 for clarity and ease of description. Nonetheless, it will be appreciated that the invention may be applied to rudder and brakes controls in a similar fashion.

Returning now to the description, the flight control surface actuation system 200 may additionally be implemented using various numbers and types of primary flight control surface actuators 204-208. In addition, the number and type of primary flight control surface actuators 204-208 per primary flight control surface 102-106 may be varied. In the depicted embodiment, however, the system 200 is implemented such that two primary flight control surface actuators 204-208 are coupled to each primary flight control surface 102-106. Moreover, each of the primary flight control surface actuators 204-208 are typically a linear-type actuator, such as, for example, a ballscrew actuator or hydraulic cylinder. It will be appreciated that this number and type of primary flight control surface actuators 204-208 are merely exemplary of a particular embodiment, and that other numbers and types of actuators 204-208 could also be used.

No matter the specific number, configuration, and implementation of the primary flight control surface actuators 204-208, the flight controls 202 are configured to receive aircraft flight control surface position commands from one or more input control mechanisms. In the depicted embodiment, the system 200 includes two inceptors, a pilot inceptor 210-1 and a co-pilot inceptor 210-2, and one or more motor controls 212. In the depicted embodiment, the pilot 210-1 and co-pilot 210-2 inceptors are both implemented as active inceptors. It will be appreciated that in some embodiments the system 200 could be implemented with more or less than this number of inceptors 210. Moreover, and as was alluded to above, the inceptors 210 could be implemented as rudder/brake pedals.

It will additionally be appreciated that the system could be implemented with more than one motor control 212, and that each flight control 202 and each motor control 212 could be integrated into a single control circuit 215, as depicted in phantom in FIG. 2. Nonetheless, the motor control 212, in response to inceptor signals supplied from one or both inceptors 210, supplies flight control surface position signals to the flight control(s) 202. The flight control(s) 202, in response to the flight control surface position signals, supplies power to the appropriate primary flight control surface actuators 204-208, to move the appropriate primary flight control surfaces 102-106 to positions that will cause the aircraft 100 to implement the commanded maneuver. As depicted in phantom in FIG. 2, in other embodiments the system 200 can be configured such that one or more signals from the user interfaces 210, such as the just-mentioned force and/or position signals, are supplied directly to the flight control(s) 202, or are supplied to one or more aircraft data buses for communication to the flight control(s) 202. It will additionally be appreciated that the system may, in some embodiments, the flight control surface actuators 204-208 may include remote electronics, such as actuator control electronics (ACEs), to close the loop.

Figure 3:
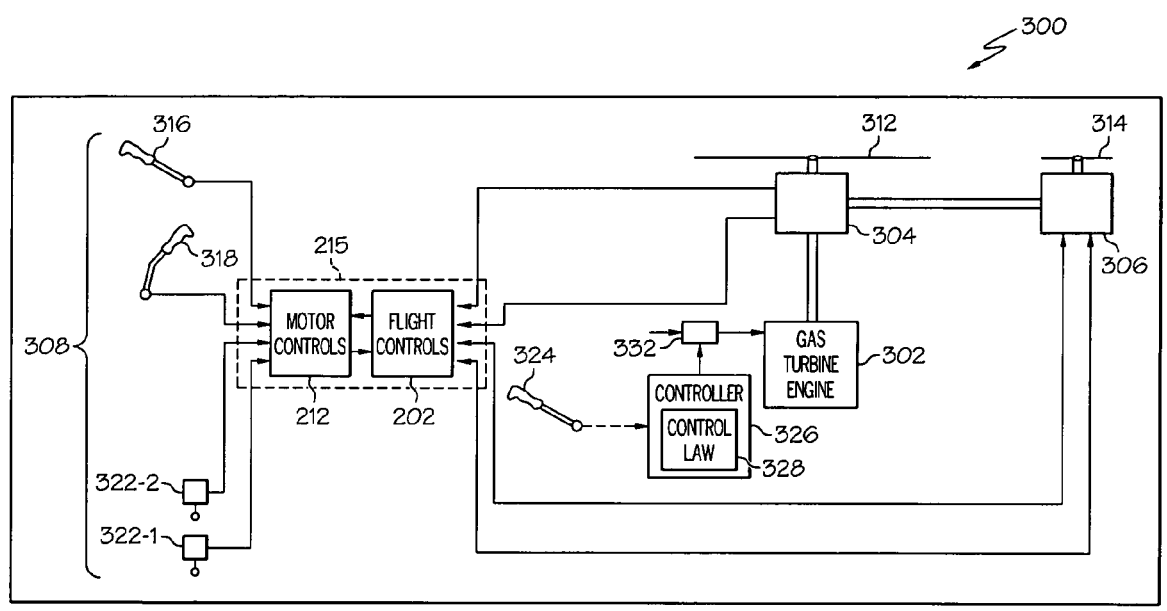
FIG. 3 depicts a functional schematic representation of an exemplary rotary-wing aircraft.

Referring now to FIG. 3, for completeness a functional schematic representation of an exemplary rotary-wing aircraft is depicted and will be described. The depicted rotary-wing aircraft is a helicopter 300 that includes a gas turbine engine 302, a main rotor 304, a tail rotor 306, and a plurality flight control inceptors 308. The gas turbine engine 302, when operating, generates torque, which is supplied, via suitable interconnecting gears and drive trains, to the main rotor 304 and the tail rotor 306.

The main rotor 304 includes a plurality of main rotor blades 312 and, when rotated by the gas turbine engine 302, generates vertical lift for the aircraft 300. The tail rotor 306 includes a plurality of rotor blades 314 and, when rotated by the gas turbine engine 302, generates a horizontal lift for the aircraft 300. The horizontal lift, as is generally known, is used to counteract the torque effect resulting from the rotation of main rotor 304, which causes the helicopter 300 to want to turn in a direction opposite to rotational direction of the main rotor 304.

The flight control inceptors 308 include three separate devices—a collective 316, a cyclic 318, and anti-torque pedals 322. The collective 316 is used to control the altitude of the helicopter by simultaneously changing the pitch angle of all the main rotor blades 312 independently of their position. Therefore, if a collective input is made, the pitch angle of all of the main rotor blades 312 change simultaneously and equally, resulting in the helicopter 300 either increasing or decreasing in altitude.

The cyclic 318 is used to control the attitude and airspeed of the helicopter 300 by controlling the pitch of the main rotor blades 312 cyclically. More specifically, the relative pitch (or feathering angle) of each of the main rotor blades 312 will vary as they rotate. The variation in relative pitch has the effect of varying the angle of attack of, and thus the lift generated by, each main rotor blade 312 as it rotates. Hence, if the cyclic 318 is moved forward or backward, the rotor disk (to which the main rotor blades 312 are coupled) tilts forward or backward, respectively, and thrust is produced in the forward direction or backward direction, respectively. Similarly, if the cyclic 318 is moved to the right or to the left, the rotor disk tilts to the right or left, respectively, and thrust is produced in the right direction or left direction, respectively.

The anti-torque pedals 322 (e.g., 322-1, 322-1) are used to control the yaw of the helicopter 300 (i.e., the direction in which it is pointed) by controlling the pitch of the tail rotor blades 314, thereby altering the amount of horizontal thrust produced by the tail rotor 306. More specifically, pressing the left pedal 322-1 or the right pedal 322-2 changes the pitch of the tail rotor blades 314, thereby increasing the horizontal thrust produced by the tail rotor 306 in the left or right direction, respectively. As a result, the helicopter 300 will yaw in the direction of the pressed pedal 322.

As with the inceptors 210 associated with the fixed-wing aircraft flight control system 200 described above, each inceptor 316-322 supplies inceptor signals to a motor control 212. The motor control 212, in response to the inceptor signals, supplies appropriate flight control signals to the flight control(s) 202. The flight control(s) 202, in response to the flight control signals, supplies power to appropriate actuation devices (not illustrated), to cause the aircraft 300 to implement the commanded maneuver. As with the fixed-wing aircraft flight control system 200, it will appreciated that the rotary-wing aircraft could be implemented with more than one motor control 212, and that each flight control 202 and each motor control 212 could be integrated into a single control circuit 215, as depicted in phantom in FIG. 3. Moreover, in other embodiments one or more signals from the inceptors 308 may be supplied directly to the flight control(s) 202, or to one or more aircraft data buses for communication to the flight control(s) 202.

The aircraft additionally includes a throttle 324, which is used to control the speed of the gas turbine engine 302. In the depicted embodiment the throttle 324 is shown as a separate power lever. It will be appreciated, however, that in some embodiments the throttle 324 may be implemented as a twist grip device that is disposed on another one of thus controls such as, for example, the collective 316. No matter how it is specifically configured, the throttle 324 supplies a suitable input signal to an engine controller 326. The engine controller 326 implements an engine control law 328 to control a suitable fuel flow control device 332, to control and regulate fuel flow to, and thus the speed of, the engine 302.

Figure 4:
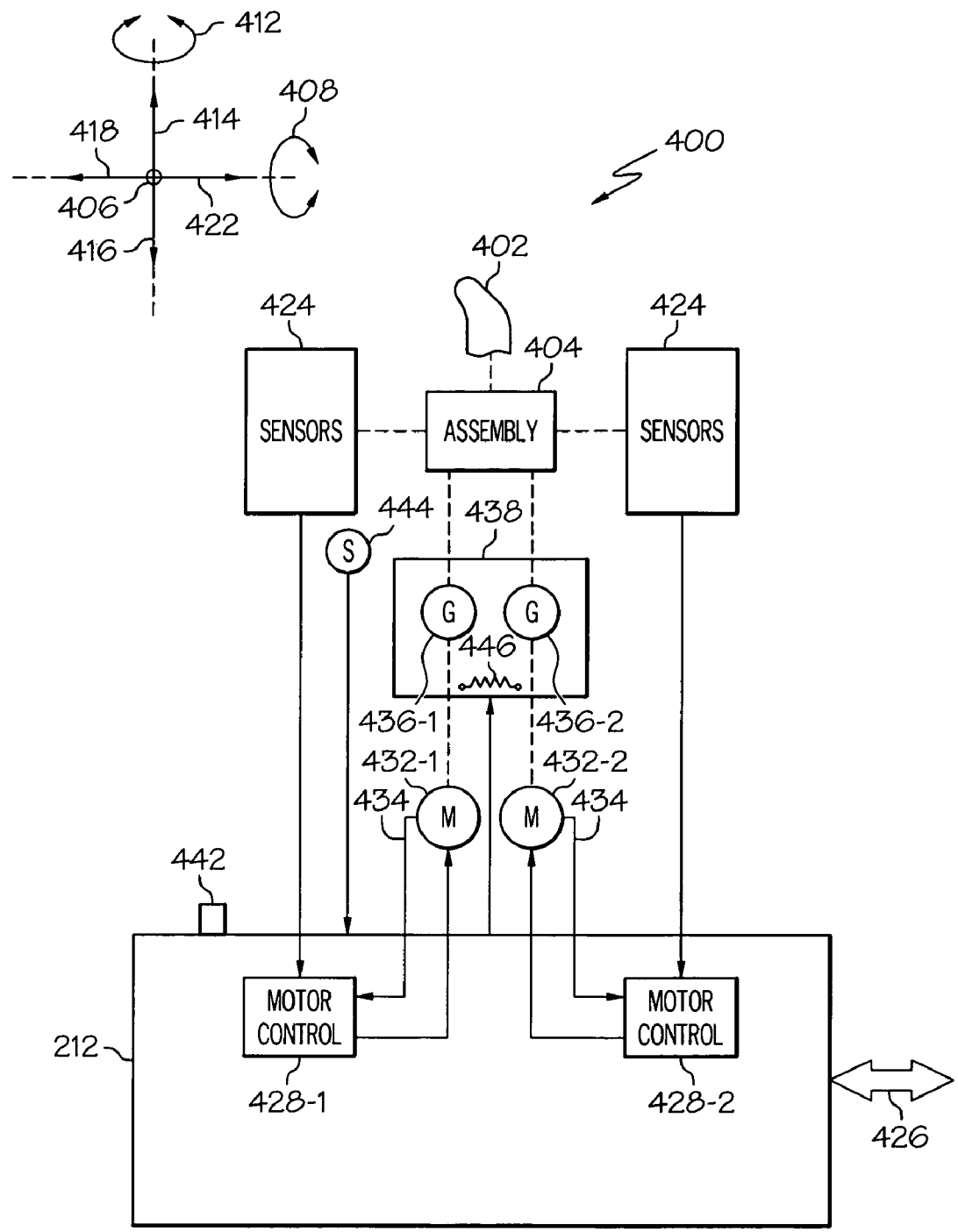
FIG. 4 is a functional block diagram of an exemplary active pilot inceptor system that may be included in the systems and/or aircraft depicted in FIGS. 1-3.

Turning now to FIG. 4, a functional block diagram of an exemplary active pilot inceptor system 400 is depicted. It should be noted that the depicted active pilot inceptor system 400 may be used to implement any one or more of the inceptors 210, 308 depicted in FIGS. 2 and 3 and described above, or any one or more of the inceptors previously mentioned but not explicitly described. In any case, it may be seen that the system 400 includes an inceptor 402 that is coupled to a suitable multiple degree-of-freedom assembly 404. As such, the inceptor 402 is configured to move, in response to input from either a pilot or a co-pilot, to a control position in a first direction or a second direction. Although the configuration of the inceptor 402 may vary, in the depicted embodiment the inceptor 402 is configured to rotate, from a null position 406 to a control position, about two perpendicular rotational axes, which in the depicted fixed wing embodiment are a pitch axis 408 and a roll axis 412. More specifically, if the pilot or co-pilot moves the inceptor 402 in a forward direction 414 or an aft direction 416, to thereby control aircraft pitch, the inceptor 402 rotates about the pitch axis 408. Similarly, if the pilot or co-pilot moves the inceptor 402 in a port direction 418 or a starboard direction 422, to thereby control aircraft roll, the inceptor 402 rotates about the roll axis 412. It will additionally be appreciated that inceptor 402 may be moved in a combined forward-port direction, a combined forward-starboard direction, a combined aft-port direction, or a combined aft-starboard direction, and back to or through the null position 406, to thereby implement a combined aircraft pitch and roll maneuver.

Inceptor sensors 424 are coupled to the inceptor 402 and supply inceptor signals to the motor control 212, the flight control(s) 202, or both. The inceptor sensors 424 may be variously implemented, but are preferably implemented using any one of numerous known force sensors, position sensors, or both. Some suitable force sensors include, but are not limited to, strain gage sensors, piezoelectric sensors, semiconductor sensors, or optical sensors, just to name a few, and suitable position sensors include, but are not limited to, absolute inceptor position sensors such as RVDTs, LVDTs, potentiometers, or optical sensors. No matter the specific number and type of intercept sensors 424, at least one of the sensors 424 is configured to supply inceptor signals representative of a vector component of inceptor movement along the pitch axis 408, and another sensor 424 is configured to supply inceptor signals representative of a vector component of inceptor movement along the roll axis 412. Depending on the type of sensors, it will be appreciated that the inceptor signals may be force signals, position signals, or both. In any case, the inceptor signals are supplied to the motor control 212.

The motor control 212, upon receipt of the inceptor signals, supplies flight control commands 426 to the flight control(s) 202, to thereby implement a desired maneuver. Alternatively, and as mentioned above and as depicted in phantom in FIG. 2, the flight control(s) 202 may receive the inceptor signals directly from the inceptor sensors 424 and, in response, cause the desired maneuver to be implemented. As FIG. 4 additionally shows, the motor control 212, at least in the depicted embodiment, includes two inceptor motor controls 428 (e.g., 428-1, 428-2). The inceptor motor controls 428-1, 428-2 each selectively energize one of the user interface motors 432-1, 432-2. The motors 432 are each operable, upon being appropriately energized, generate torque and supply haptic feedback to the inceptor 402. Preferably, the motors 432 are each implemented using multi-phase brushless DC machines. As such, rotor commutation signals 434 associated with each motor 432 are supplied to that motor's associated motor control 428.

Preferably, the motors 432 are both coupled to the inceptor 402 via one or more lubricated gears 436-1, 436-2 that are preferably disposed in a gearbox housing 438. It is noted that for clarity the lubricated gears 436 are depicted as being disposed in a single gearbox housing 438; however, the gears 436 could be disposed in separate gearbox housings. In any case, as was previously noted, at relatively low temperatures, the friction within the active pilot inceptor system 400 increases due, in part, to the increased lubricant viscosity, and the tolerances of the gears 436 and non-illustrated motor bearings. Thus, the active pilot inceptor system 400 is additionally configured to implement a self warm-up function to sufficiently raise system temperatures. As will now be described, the system 400 implements the self warm-up function using heat generated by one or both of the motors 432.

The motor controls 428, in addition to being configured to selectively energize the multi-phase motors 432 to generate torque, are also configured to selectively energize one or both of the multi-phase motors 432 in a manner that one or both of the multi-phase motors 432 do not generate torque. The multi-phase motors 432, when energized in this latter manner, will nonetheless generate heat due to resistive heating of the motor windings. By disposing the motors 432, gears 436, and/or gear housing 438 in sufficiently close proximity, the heat generated in the motors 432 will warm the lubricant, gears 436, and/or gear housing 438.

It was previously noted that the multi-phase motors 432 are preferably brushless DC machines. It is noted here that the motors 432 may be wye-wound, delta-wound, or implemented with independent phases. No matter the specific winding configuration, the motor controls 428, using known brushless DC motor commutation, control a minimum of six non-illustrated switching devices (e.g., FETs, IGBTs, etc.) to control current flow in the motor 432. Thus, for wye-wound or delta-wound motors, when the system 400 is implementing the self warm-up function, the motor controls 428 will control the switching devices to simultaneously connect one or two of the motor phases to a supply voltage, and one of the phases to return. For motors with independent phases, all three phases may be connected at one end to a supply voltage and at another end to return. In both cases, the net result is that the motor rotor will move to a locked rotor position, but current flow through the stator windings will continue and cause the motors 432 to generate heat. Preferably, the motor controls 428 are additionally configured, during self warm-up of the system 400, to limit current flow through the motors 432 to a level that will prevent the motors 432 from overheating.

The active pilot inceptor system 400 may be configured to initiate the self warm-up function either manually or, most preferably, automatically. If configured to initiate the self warm-up manually, the system 400 includes a self warm-up initiation switch 442 that may be selectively operated by the pilot (or co-pilot). The motor controls 428, in this configuration, are responsive to operation of the switch 442 to energize the associated motors 432, as described above, to generate heat but no torque. The motor controls 428 will continue to energize the associated motors 432 in this manner until the switch 442 is again operated or a predetermined reset temperature is reached. In this regard, and as FIG. 4 further depicts, the system 400 additionally includes one or more suitable temperature sensors 444 (only one depicted). It may be appreciated that if the initiation switch 442 is included, a protective cover may preferably be included to prevent inadvertent operation of the switch 442, and thus inadvertent initiation of the of the self warm-up.

As was noted above, the system 400 is preferably configured to initiate the self warm-up automatically. With this configuration, if the one or more temperature sensors 444 senses that the temperature adjacent one or both of the multi-phase motors 432 is less than a predetermined temperature, then the motor controls 428 will energize the associated motors 432, as described above, to generate heat but no torque. The motor controls 428 will continue to energize the associated motors 432 in this manner until the predetermined reset temperature, as sensed by the one or more temperature sensors 444, is reached. The system 400 is also preferably configured such that an appropriate signal is supplied to, for example, non-illustrated engine controllers to preclude engine startup whenever the self warm-up is being conducted. Similarly, the system 400 is preferably configured to preclude initiation of the self warm-up if the engine(s) is(are) running and/or the aircraft is on the ground.

In each of the described embodiments, the system 400 may further include, if needed or desired, integral heaters 446 within the gearbox housing(s) 438. The heaters 446, if included, may be energized from the motor control 212 and used to supplement the heat supplied from the motors 432. The heaters 446 may be variously implemented. For example, the heaters 446 could be bonded on heat strips or embedded within the gearbox housing(s) 438 when the housing(s) is(are) cast.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An active pilot inceptor system, comprising:
   a pilot inceptor configured to receive user input and operable, in response to the user input, to move to a control position;
   a multi-phase motor coupled to the pilot inceptor to selectively supply haptic feedback thereto; and
   a motor control operable to (i) selectively energize the multi-phase motor in a manner that causes the multi-phase motor to generate torque and supply the haptic feedback to the inceptor and (ii) selectively energize the multi-phase motor in a manner that the multi-phase motor does not generate torque,
   wherein the motor control, when energizing the multi-phase motor in a manner that the multi-phase motor does not generate torque, limits current flow to the multi-phase motor.

2. The system of claim 1, further comprising:
   a temperature sensor operable to sense a temperature that is at least representative of a temperature adjacent the multi-phase motor and to supply a temperature signal representative thereof.

3. The system of claim 2, wherein the motor control is coupled to receive the temperature signal and is further operable, in response to the temperature signal, to selectively energize the multi-phase motor in the manner that the multi-phase motor does not generate torque.

4. The system of claim 3, wherein the motor control is further operable to automatically energize the multi-phase motor in the manner that the multi-phase motor does not generate torque when the temperature signal indicates that the temperature adjacent the multi-phase motor is below a predetermined temperature.

5. The system of claim 4, wherein the motor control is further operable to automatically cease energizing the multi-phase motor in the manner that the multi-phase motor does not generate torque when the temperature signal indicates that the temperature adjacent the multi-phase motor is above a predetermined reset temperature.

6. The system of claim 1, further comprising:
one or more lubricated gears coupled between the pilot inceptor and the multi-phase motor, and disposed in proximity to the multi-phase motor to receive heat generated in the multi-phase motor.

7. The system of claim 6, further comprising:
a temperature sensor operable to sense a temperature that is at least representative of a temperature adjacent the one or more lubricated gears and to supply a temperature signal representative thereof.

8. The system of claim 7, wherein the motor control is coupled to receive the temperature signal and is further operable, in response to the temperature signal, to selectively energize the multi-phase motor in the manner that the multi-phase motor does not generate torque.

9. The system of claim 8, wherein the motor control is further operable to automatically energize the multi-phase motor in the manner that the multi-phase motor does not generate torque when the temperature signal indicates that the temperature adjacent the one or more lubricated gears is below a predetermined temperature.

10. The system of claim 9, wherein the motor control is further operable to automatically energize the multi-phase motor in the manner that the multi-phase motor does not generate torque when the temperature signal indicates that the temperature adjacent the one or more lubricated gears is above a predetermined reset temperature.

11. The system of claim 1, wherein the multi-phase motor is selected from the group consisting of a wye-wound brushless DC machine, a delta-wound brushless DC machine, and a brushless DC machine with independent phases.

12. The system of claim 1, wherein the motor control, when energizing the multi-phase motor in a manner that the multi-phase motor does not generate torque, is further operable to supply an engine start inhibit signal.

13. The system of claim 1, wherein the motor control is further adapted to receive a signal indicating that one or more propulsion engines are running and is further operable, in response thereto, to not energize the multi-phase motor in a manner that the multi-phase motor does not generate torque.

14. An active pilot inceptor system, comprising:
a pilot inceptor configured to receive user input and operable, in response to the user input, to move to a control position;
a multi-phase motor coupled to the pilot inceptor to selectively supply haptic feedback thereto;
a gearbox housing disposed in proximity to the multi-phase motor to receive heat generated in the multi-phase motor;
a gearbox temperature sensor operable to sense a temperature that is at least representative of temperature within the gearbox housing and to supply a temperature signal representative thereof;
one or more lubricated gears disposed within the gearbox housing and coupled between the pilot inceptor and the multi-phase motor; and
a motor control coupled to receive the temperature signal, the motor control operable to (i) selectively energize the multi-phase motor in a manner that causes the multi-phase motor to generate torque and supply the haptic feedback to the inceptor and (ii) in response to the temperature signal, selectively energize the multi-phase motor in a manner that the multi-phase motor does not generate torque.

15. The system of claim 14, wherein the motor control is operable to automatically energize the multi-phase motor in the manner that the multi-phase motor does not generate torque when the temperature signal indicates that the temperature within the gearbox housing is below a predetermined temperature.

16. The system of claim 15, wherein the motor control is further operable to automatically energize the multi-phase motor in the manner that the multi-phase motor does not generate torque when the temperature signal indicates that the temperature within the gearbox housing is above a predetermined reset temperature.

17. The system of claim 14, wherein the motor control, when energizing the multi-phase motor in a manner that the multi-phase motor does not generate torque, is further operable to supply an engine start inhibit signal.

18. The system of claim 14, wherein the motor control is further adapted to receive a signal indicating that one or more propulsion engines are running and is further operable, in response thereto, to not energize the multi-phase motor in a manner that the multi-phase motor does not generate torque.

19. An active pilot inceptor system, comprising:
a pilot inceptor configured to receive user input and operable, in response to the user input, to move to a control position;
a multi-phase motor coupled to the pilot inceptor to selectively supply haptic feedback thereto; and
a motor control operable to (i) selectively energize the multi-phase motor in a manner that causes the multi-phase motor to generate torque and supply the haptic feedback to the inceptor and (ii) selectively energize the multi-phase motor in a manner that the multi-phase motor does not generate torque,
wherein the motor control is further adapted to receive a signal indicating that one or more propulsion engines are running and is further operable, in response thereto, to not energize the multi-phase motor in a manner that the multi-phase motor does not generate torque.

* * * * *